(No Model.)
J. DELAY.
APPLIANCE FOR TEACHING PENMANSHIP.
No. 414,300. Patented Nov. 5, 1889.
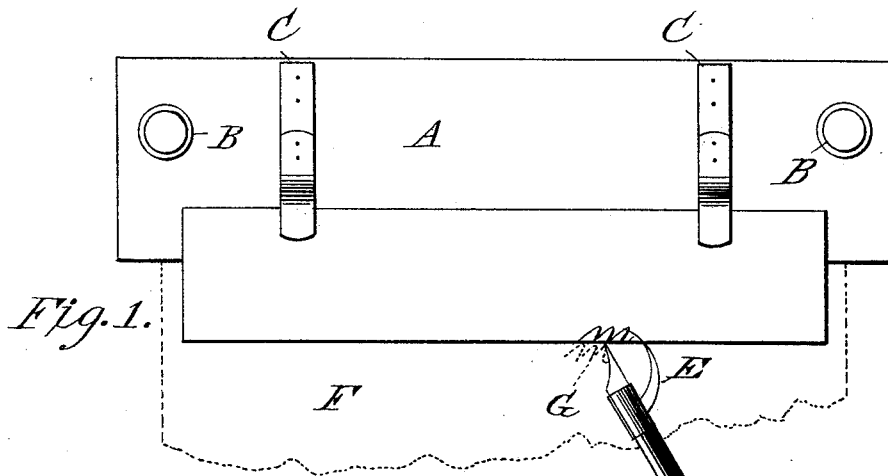
Fig. 1.
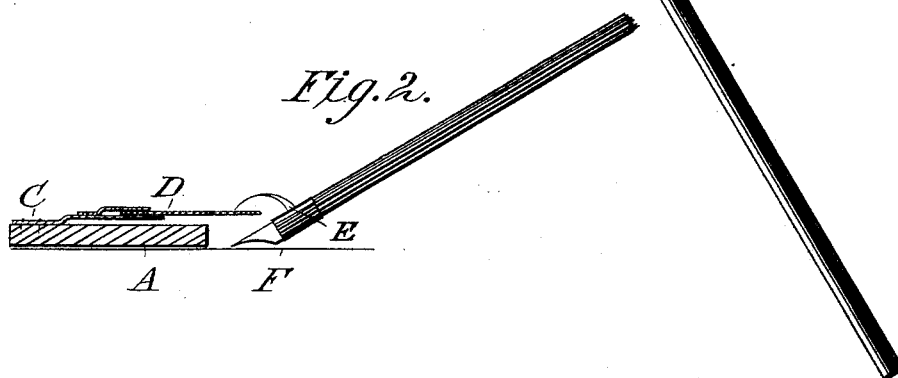
Fig. 2.
Fig. 3.
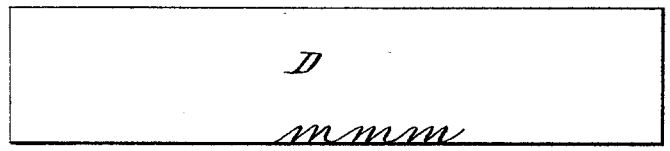
Witnesses
M. L. Leach
Chas. B. Morford
Inventor
James Delay

UNITED STATES PATENT OFFICE.

JAMES DELAY, OF KANSAS CITY, MISSOURI.

APPLIANCE FOR TEACHING PENMANSHIP.

SPECIFICATION forming part of Letters Patent No. 414,300, dated November 5, 1889.

Application filed February 21, 1889. Serial No. 300,781. (No model.)

*To all whom it may concern:*

Be it known that I, JAMES DELAY, a citizen of the United States, residing at Kansas City, in the county of Jackson and State of Missouri, have invented certain new and useful Improvements in Apparatus for Teaching Penmanship; and I do hereby declare the following to be a full, clear, and exact description of the invention, such as will enable others skilled in the art to which it appertains to make and use the same.

My invention relates to a new and useful apparatus for teaching penmanship.

It has for its object the familiarization of the hand of the person with a correct formation of letters.

With these objects in view the invention consists in certain features of construction and combination of parts, as will be hereinafter set forth.

In the accompanying drawings, Figure 1 is a view of the entire mechanism as seen when in use. Fig. 2 is a sectional view of the same. Fig. 3 shows the copy-plate and tracing-point.

In the accompanying drawings, A is a thin smoothly-finished plate of wood or other material.

B B are thumb-tacks to secure A to the writing-desk.

C C are metallic springs secured firmly to A, and are for the purpose of holding the copy-plate D firmly in position.

D is the copy-plate, made of a thin sheet of metal with letters indented by stamping or engraving in its margin, the object of which letters is to receive and guide the movements of the pen-point by controlling movement of the tracing-point E.

E is the tracing-point, of metal, securely fastened to an elastic metallic band for the purpose of adjusting it to any sized pen-holder. It is made of metal and preferably of one piece.

F is the sheet of paper on which the person is supposed to be writing.

G is the letters or writing produced on the paper, the formation of which is derived from the letters or writing in the margin of the plate D.

I claim—

1. As a combination in an apparatus for teaching penmanship, the thin smoothly-finished plate of wood or other material A, the tacks B B, the metallic springs C C, the metallic plate D, and the tracing-point E, and the pen-holder to which tracing-point is attached, as set forth.

2. In an apparatus for teaching penmanship, the plate A, with the springs C for securely holding the copy-plate D in position, a plate D, having marginal sunken letters providing a guide for the tracing-point E, and a tracing-point E, securely fastened to a pen-holder used by the person writing, substantially as set forth.

In testimony whereof I have affixed my signature in presence of two witnesses.

JAMES DELAY.

Witnesses:
JAMES G. YOUNG,
BESSIE E. YOUNG.